Figure 1:
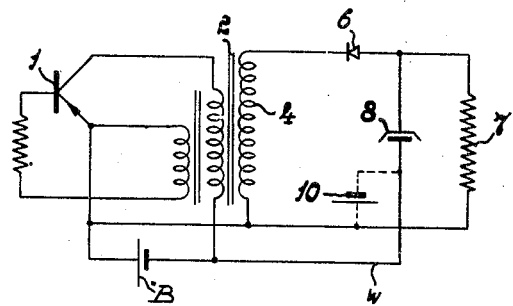

Feb. 5, 1957   P. J. H. JANSSEN   2,780,767
CIRCUIT ARRANGEMENT FOR CONVERTING A LOW
VOLTAGE INTO A HIGH DIRECT VOLTAGE
Filed April 7, 1955

INVENTOR
PETER JOHANNES HUBERTUS JANSSEN

BY
AGENT

United States Patent Office 2,780,767
Patented Feb. 5, 1957

2,780,767

CIRCUIT ARRANGEMENT FOR CONVERTING A LOW VOLTAGE INTO A HIGH DIRECT VOLTAGE

Peter Johannes Hubertus Janssen, Eindhoven, Netherlands, assignor to Hartford National Bank and Trust Company, Hartford, Conn., as trustee Application April 7, 1955, Serial No. 499,944

Claims priority, application Netherlands May 31, 1954

3 Claims. (Cl. 321—2)

The invention relates to a circuit arrangement for converting a low voltage into a high voltage. More particularly, the invention relates to a circuit arrangement for converting a low voltage into a high voltage with the aid of a transistor fed by the low voltage and caused to oscillate by aperiodic transformer feedback, this transistor producing pulses of the high voltage across a winding of the transformer, which pulses are supplied through a rectifier to a load, which is bypassed by a capacitor for the frequency of the pulses produced.

Such a circuit arrangement is described for example in pending United States patent application Serial No. 442,774, filed July 12, 1954. It is found that difficulties may arise before the transistor may self-oscillate. These difficulties are to be attributed mainly to the fact that the bypass capacitor, when the arrangement is switched on, produces an excessive damping of the pulses to be produced.

In accordance with the present invention, in order to facilitate the self-oscillation of the transistor, a voltage source is included in the closed circuit comprising the said transformer winding, the said rectifier and the said capacitor, this source being connected with a polarity opposite to the pass direction of the rectifier.

Figure 2:
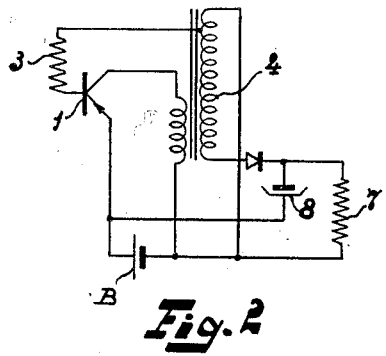

The invention will now be described with reference to the drawing, in which:

Fig. 1 is a schematic diagram of an embodiment of the circuit arrangement of the present invention; and Fig. 2 is a modification of the embodiment of Fig. 1.

According to Fig. 1, the transistor 1, which may comprise a junction transistor, is fed by a source of low voltage and has aperiodic feedback by means of a transformer 2 in a manner such that across a winding 4 of the transformer 2 pulses of the desired high voltage are produced. These pulses are supplied through a rectifier 6 to a load 7, which is bypassed for the frequency of the pulses by means of a capacitor 8.

If the capacitor 8 is omitted, it is found that the circuit arrangement, when the source B is switched into the circuit, starts self-oscillating only if the resistance of the load 7 exceeds a given minimum value, since otherwise said load produces an excessive damping of the pulses to be produced. The invention is based on the recognition of the fact that the capacitor 8, if it is, as usual, connected directly in parallel with the load 7, can prevent the arrangement from self-oscillating for similar reasons. As soon as a pulse tends to occur across the winding 4, it has to supply, through the rectifier 6, to the capacitor 8, a charging current which is liable to load the pulse to an extent such that the arrangement cannot start self-oscillating.

In order to obviate this difficulty, the closed circuit comprising the winding 4, the rectifier 6 and the capacitor 8, includes, in accordance with the invention, a voltage source connected with a polarity opposite to the pass direction of the rectifier 6. This voltage source may be a separate source 10; in this case the lead w must be interrupted, but the source B itself will, preferably, be used for this purpose. This permits the amplitude of the pulses produced across the winding 4 to increase unhindered to the voltage value of the source 10 or B, respectively, before a charging current is required for the capacitor 8. The energy accumulated in the transformer 2 with its parasitic capacities suffices to keep the oscillation going. The lower end terminal of the load 7 may, if desired, be connected to the lead w, instead of being connected as shown in Fig. 1.

Fig. 2 shows a modification of the arrangement of Fig. 1, in which part of the winding 4 also serves for the feedback. If the source B is again used as the voltage source in series with the capacitor 8, as shown, a larger base resistor 3, in which more energy is dissipated, must be used. In the event of a short-circuit of the load 7 there is a greater risk of overload of the transistor 1.

The principle described above may, of course, also be applied to the circuit arrangements described in detail in the aforementioned pending patent application.

While the invention has been described by means of specific examples and in specific embodiments, I do not wish to be limited thereto, for obvious modifications will occur to those skilled in the art without departing from the spirit and scope of the invention.

What I claim is:

1. A circuit arrangement for producing a high voltage from a low voltage source, comprising an oscillator system energized by said voltage source and comprising a transistor having input and output electrodes and transformer means interconnecting said electrodes in feedback relationship, means comprising a winding of said transformer for deriving high voltage pulses from said oscillator system, a rectifier and a capacitor connected in series circuit arrangement with said transformer winding, means for applying to said series circuit arrangement a biasing potential having a polarity opposite to the pass direction of said rectifier, and means coupled to said capacitor for deriving a high voltage therefrom.

2. A circuit arrangement as claimed in claim 1, further comprising means for applying said biasing potential to an input electrode of said transistor.

3. A circuit arrangement for producing a high voltage from a low voltage source, comprising an oscillator system energized by said voltage source and comprising a transistor having input and output electrodes and transformer means interconnecting said electrodes in feedback relationship, means comprising a winding of said transformer for deriving high voltage pulses from said oscillator system, a rectifier and a capacitor connected in series circuit arrangement with said transformer winding, means for applying to said series circuit arrangement a biasing potential having a polarity opposite to the pass direction of said rectifier, means for applying said biasing potential to an input electrode of said transistor, and means coupled to said capacitor for deriving a high voltage therefrom, said transformer winding and said rectifier being connected in series circuit arrangement with said last-mentioned means.

References Cited in the file of this patent

UNITED STATES PATENTS

| | | |
|---|---|---|
| 1,949,383 | Weber | Feb. 27, 1934 |
| 2,556,286 | Meacham | June 12, 1951 |
| 2,568,485 | Cage | Sept. 18, 1951 |
| 2,657,360 | Wallace | Oct. 27, 1953 |
| 2,658,176 | Wilcox | Nov. 3, 1953 |
| 2,748,274 | Pearlman | May 29, 1956 |